May 15, 1962 W. R. NICHOLS 3,034,390

SOUND REPRODUCING DEVICE

Filed June 22, 1959 2 Sheets-Sheet 1

INVENTOR.
WILLIAM R. NICHOLS

BY Reif and Gregory

ATTORNEYS

May 15, 1962 W. R. NICHOLS 3,034,390

SOUND REPRODUCING DEVICE

Filed June 22, 1959 2 Sheets-Sheet 2

INVENTOR.
WILLIAM R. NICHOLS
BY Reifand Gregory
ATTORNEYS 3,034,390

SOUND REPRODUCING DEVICE

William R. Nichols, 2429 Lyndale Ave. S., Minneapolis, Minn.

Filed June 22, 1959, Ser. No. 821,814
1 Claim. (Cl. 84—1.15)

This invention relates to a sound reproducing device and more particularly in connection with a Swiss sound box to a sound reproducing mechanism of relatively small size capable of reproducing a large volume of sound suitable for public sound addressing purposes such as may be used by a street vendor for audibly advertising his wares.

It is desirable to have such a sound reproducing device that is small enough in size to be readily carried about by hand and yet which will produce a sufficiently strong signal that will be audible for a considerable distance. Such sound reproducing devices commonly in use require relatively high voltage, such as 200 volts, and a relatively high amperage such as six amps. Such devices therefore require the use of a relatively heavy storage battery. These are heavy and bulky and require a vehicle, such as a motor vehicle, for transport. The applicant's device here presented is adapted for operation by a small four dry cell six volt battery and requires only one-half an amp for operation. Thus, in view of the small size battery which may be used, applicant's entire device including said battery is of such small size that it may be held in the hand of an operator.

It is an object of this invention therefore in connection with a Swiss type sound box to provide a sound reproducing device small enough in size to be held in one hand of an operator and having a signal of such strength that it can be clearly heard for a relatively long distance.

It is another object of this invention to provide a sound reproducing device adapted to produce a sufficiently audible signal for public addressing purposes, said device having a sound reproducing mechanism requiring only a low voltage source of power, such as six volts, and only one-half an amp for operation.

It is another object of this invention to provide a sound reproducing device in connection with a Swiss type sound box having a plurality of transversely spaced reeds therein, an electro magnet, a sound pickup plate in connection with said magnet and a pole piece of narrow transverse dimension disposed in a plane substantially at right angles to the plane of said reeds and being closely spaced thereto whereby there is provided an unusually high concentration of magnetic flux density and an unusually clear definition of sound through said pickup plate.

It is a further object of this invention to provide a sound reproducing device in connection with a Swiss type sound box having a plurality of transversely spaced reeds therein, an electromagnet, a sound pickup plate connected to said magnet and having a portion thereof forming a pole piece disposed in a plane substantially at right angles to the plane of said reeds, said pole piece having a narrow edge portion spaced just a sufficient distance away from said reeds to avoid physical contact with a vibrating reed whereby a narrow gap spacing results giving a relatively powerful flux density for very clear definition of sound and for a concentration of area for sound pickup.

These and other objects and advantages of the invention will be fully set forth in the following description made in connection with the accompanying drawings in which like reference characters refer to similar parts throughout the several views and in which.

Figure 1:
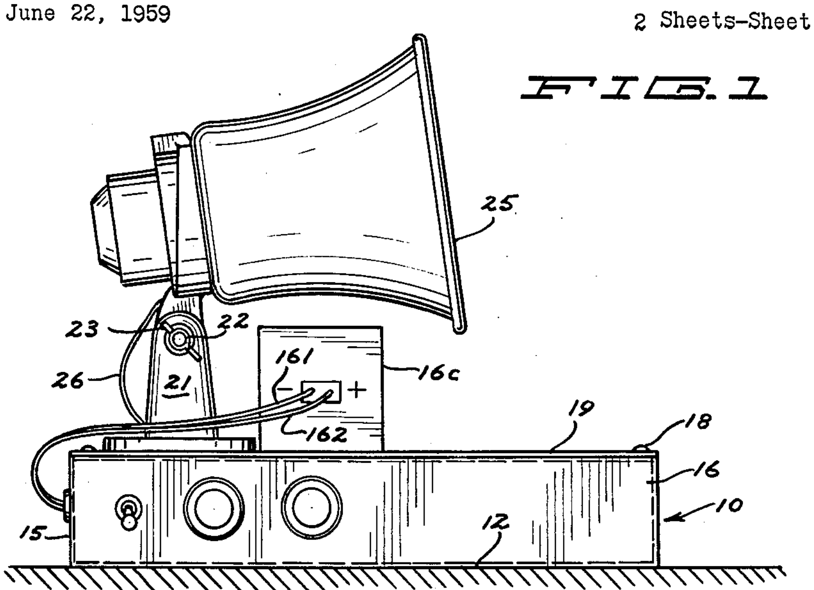
FIG. 1 is a view of applicant's device in side elevation.
Figure 2:
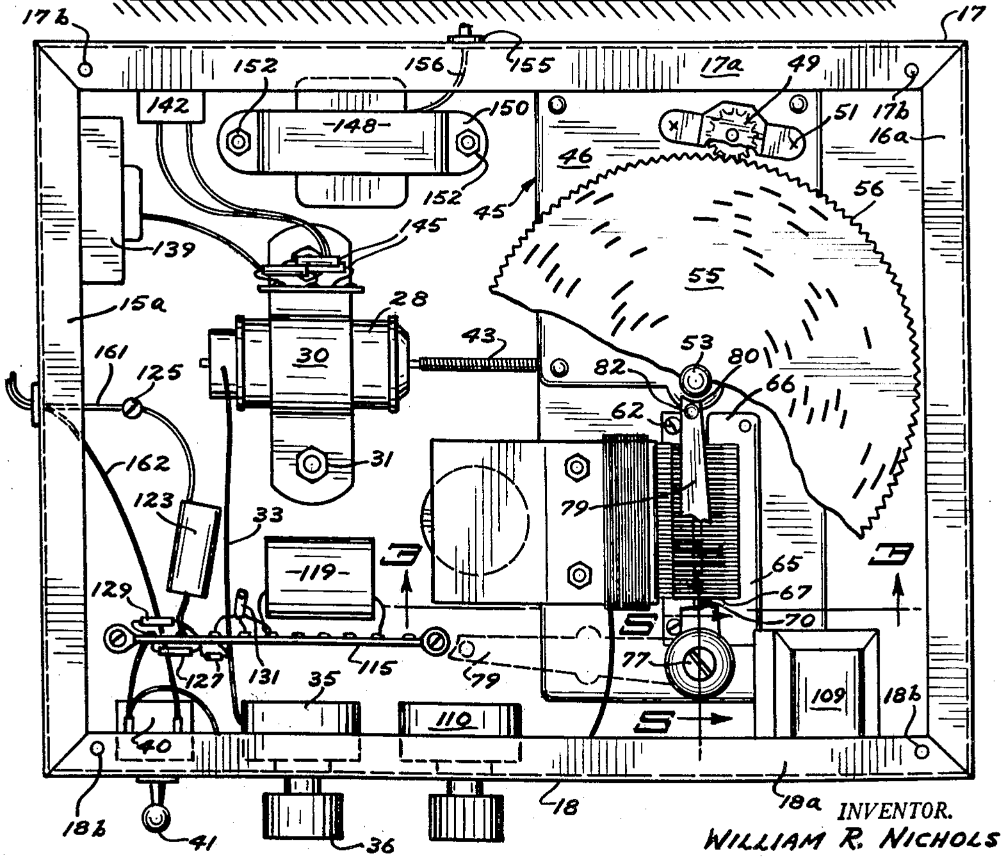
FIG. 2 is a top plan view of the interior of applicant's device on an enlarged scale with the cover portion thereof removed.

Referring to the drawings, like reference characters refer to identical parts throughout the several views. With reference to FIGS. 1 and 2, applicant's device comprises a casing 10 shown here to be parallelepiped in form having a bottom 12 and sides 13, 14, 15 and 16. Said sides respectively have inwardly turned right-angled flanges 13*a*, 14*a*, 15*a* and 16*a* formed at their upper end portions. Adapted to overlie said casing and be secured to said flanges by screws 18 through apertures 17*b* and 18*b* is a top 19.

Mounted on said top 19 is an upstanding bracket 21 having pivoted thereto by a bolt 22 and a thumb screw 23 a speaker 25 indicated here as being a commonly used type of speaker adapted for outdoor exposure. Running from said speaker 25 is a cable 26. Said cable will have a plug-in jack at its free end not here shown for connection with an output transformer hereinafter to be indicated.

Disposed in said casing 10 is a miniature type of motor 28 secured by a U-shaped strap type of clamp 30 and bolts 31 to said bottom 12. Said motor is connected by a conduit 33 to a rheostat or speed control member 35 having a control knob 36 and being connected to a switch 40 having an outwardly extending toggle 41.

Figures 3, 4, 5, 6:
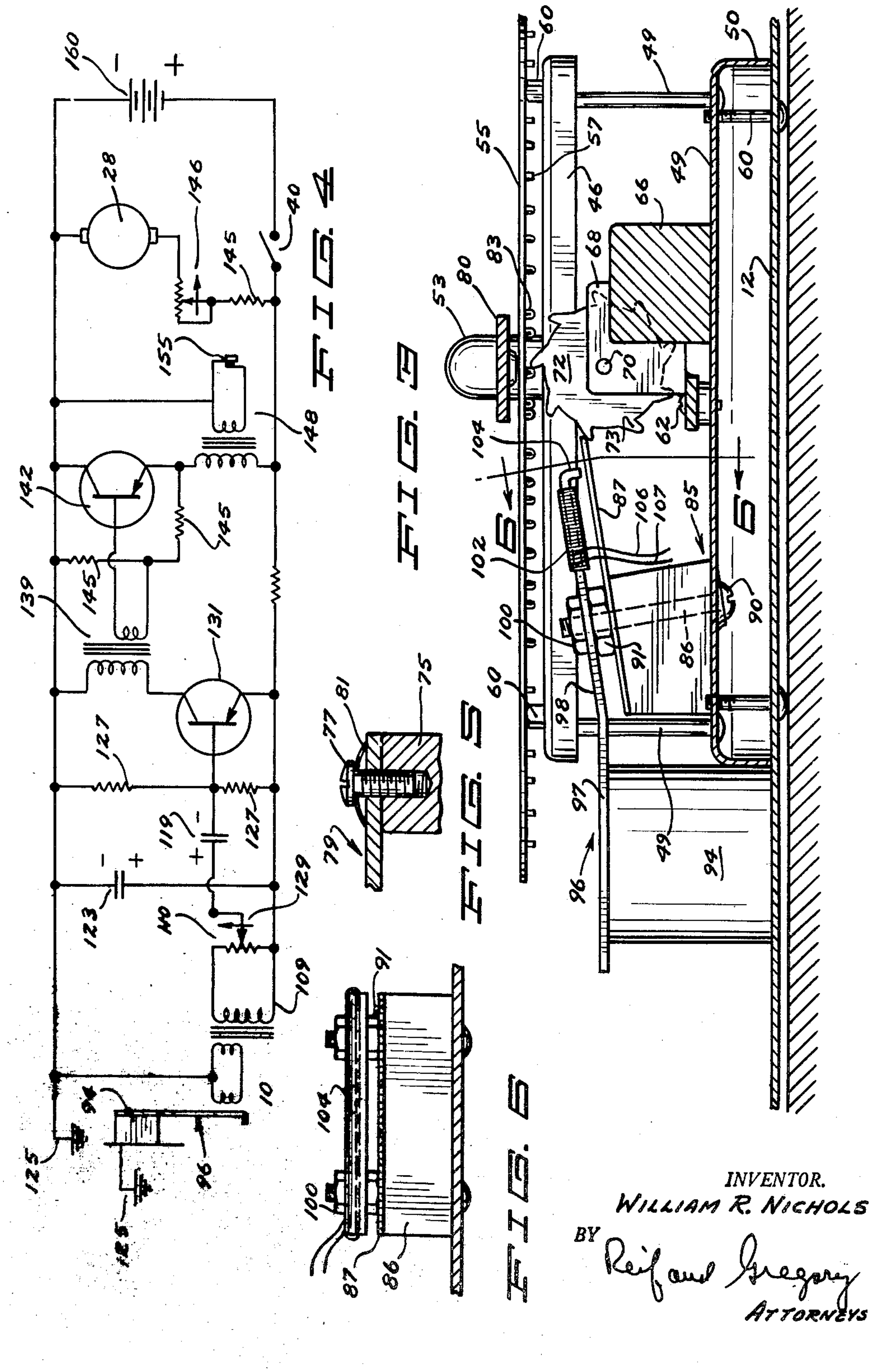
FIG. 3 is a view in vertical section on an enlarged scale taken on line 3—3 of FIG. 2 as indicated by the arrows.
FIG. 4 is a wiring diagram of applicant's device.
FIG. 5 is an enlarged view in vertical section taken on line 5—5 of FIG. 2 as indicated by the arrows showing a portion of applicant's device.
FIG. 6 is a view of a portion of applicant's device taken on line 6—6 of FIG. 3 is indicated by the arrows.

Extending from said motor 28 is a flexible driveshaft 43 running to a gear reduction box 45 comprising a top plate 46 spaced above a base or mounting plate 47 by pins 49 spot welded in position. No novelty is claimed as to the combination of reduction gears in said gear reduction box 45. This box forms no particular portion of applicant's invention. It is of a common type readily available and its construction is well known in the art. Extending upwardly of said plate 46 is a pinion 49 driven through intervening gears not here illustrated by said driveshaft 43. Said pinion has a U-shaped strap guard 51 extending thereover and spot welded to said plate 46 at its ends. Upstanding through said plate member 46, as indicated in FIGS. 2 and 3, is a cylindrical post 53 adapted to have a record 55 mounted thereon. Said record as here illustrated is provided with a toothed edge 56 adapted to have engagement with said pinion 49 to be rotated thereby. Upstanding from said plate 46 are a plurality of spaced studs 60 adapted to support said record 55 in a level playing position. Said record 55 has depending teeth 57 struck therefrom and specifically arranged to produce a desired signal, as will be explained. Record 55 is of a type commonly used, as in Swiss music boxes.

Said base plate 49 is here shown to be spaced upwardly from said bottom 12 and having depending side portions 50 and being secured in position by upstanding elongated rivets 60.

Mounted on said plate 49 by bolts 62 in a direction at right angles to said gear box 45 and substantially in alignment with said post 53 is a block 65. Said block 65 which may be variously formed is here indicated as being substantially parallelepiped in form having solid end portions 66 and having a U-shaped cutout portion 67 therebetween. Disposed in said cutout portion and secured in a suitable manner at their inner ends to said block 65 are a plurality of parallel transversely spaced rectangular plates 68 extending forwardly of said block for a distance substantially half of their width. Disposed through the forwardly extending portions of said plates parallel to said block is a shaft 70. Journaled on said shaft 70 and being disposed respectively to be in positions between said spaced plates are a plurality of star wheels 72. Said star wheels have spaced thereabout a plurality of somewhat tangentially extending teeth 73 as indicated in FIG. 3. Extending upwardly of the outer end of said block 65 is a hub 75 as indicated in FIG. 5 having pivoted thereon by a screw 77 a record guard arm 79 shown partially in solid line in FIG. 2 with a central portion thereof broken away. The inner end 80 of said guard arm 79 is adapted to engage said post 53 and has extending upwardly therefrom a stud 82 forming a handle. Disposed between said arm and said post is a pressure washer 79. Depending from said guard arm are a plurality of spaced buttons 83 adapted to steady said record 55 as it rides on said lugs 60.

Mounted on plate 49 in opposed relation to said block 66 is a reed comb 85 comprising a base block 86. Overlying said block 86 and extending outwardly therefrom in the direction of said block 66 are a plurality of transversely spaced reeds 87. Said reeds will have their free end portions terminate in a common plane and be positioned in relation to said star wheel 72 so that said reeds will be respectively in alignment with said star wheels and adapted to have their ends just engaged by said teeth 73 of said star wheels 72 as said star wheels are rotated whereby said teeth will strike said reeds. Said reed comb 85 is secured to said plate 49 by bolts 90 extending upwardly therethrough, as indicated in FIG. 3, and having nuts 91 securing the same in position. Said reed block 86 is here indicated as having an upwardly inclined upper surface to support said reeds in an upwardly inclined position and having an upwardly and rearwardly inclined front wall.

Secured to said bottom 12 adjacent the outer end of said reed block 86 is an electro magnet 94. Said magnet may take on various forms, but is here shown to be cylindrical in form. Overlying said magnet 94 and said reed comb 85 is a sound pickup member 96. Said pickup member may be variously formed. In the embodiment of the invention here disclosed, said pickup member is shown to be in the form of a flat plate rectangular in plan and having a horizontally disposed base portion 97 secured to the top of said magnet 94 and having an upwardly inclined forwardly extending portion 98 in a plane parallel to the plane of said reeds 87. Said bolts 90 extend through said inclined portion 98 and additional nuts 100 are threaded onto the extended ends of said bolts 86 to hold said pickup member secure. Said forwardly extending portion 98 forms a core for a coil winding 102 thereabout adjacent its free end portion. A pole piece 104 adjacent the pole ends of said reeds 87 is used in connection with said pickup member 96. Said pole piece is disposed in a plane at right angles to the plane of said reeds. Said pole piece may be variously formed. In the embodiment of the invention here disclosed said pole piece is shown formed as a depending flange at the free end of said pickup member in a plane substantially at right angles to the plane of said reeds and extending substantially transversely across said reeds. Said pole piece is formed to have a relatively narrow width and is spaced a distance to be separated just sufficiently from said reeds 87 to avoid having physical contact with said reeds when the same are in a vibrating condition.

Said coil winding 102 is connected to an input transformer 109. Said input transformer 109 is connected to a volume control member 110.

Upstanding from said bottom 12 adjacent said members 40 and 110, as indicated in FIG. 2, is a terminal strip 115, and connected thereto is a coupling condensor 119. Also connected to said terminal strip is a bypass condensor 123 grounded to ground 125. Connected to said terminal strip are bias resistors 127 shown here to be two in number, and in connection therewith a dropping resistor 129 having connection with the input transformer 109 and also connected therewith is a driver transistor 131 forming a common type of amplifier hookup or system. Connected to said amplifier hookup through said terminal strip is a driver transformer 139 in circuit with a power transistor 142, bias resistors 145 shown to be two in number, a dropping resistor 146 and an output transformer 148. Said output transformer is secured by a strap clamp 150 and nutted bolts 152, and is in circuit with said amplifier hookup above described. Said output transformer 139 is connected to a speaker jack 155 by a cable 156.

A battery 160 is connected to a ground cable 161 and to a cable 162 running to said switch 40.

The entire above indicated is a common and well known type of circuit for the apparatus being described. Connecting wires are indicated in the wiring diagram but it is not believed that any further explanation is necessary for a full understanding of the same.

The area of inventive novelty in the applicant's device is centered about the electro-magnet pickup mechanism.

All that is required to provide power for the applicant's device is a four cell six volt battery which is small enough in size to be easily held in the palm of an average size hand. The case of applicant's device is approximately 7 inches by 9 inches in size with approximately 2 inch depth. Thus, the applicant's entire device with a speaker mounted thereon is easily carried about in one hand.

To operate applicant's device toggle 41 is moved to close switch 40 to operate motor 28 to rotate the record 55. The guard arm 79 is swung to overlie a radial portion of said record to hold the same in a level operating position in connection with the upstanding lugs 60 whereby said record is held in position even while said device is being moved about.

Said record 55 will be one selected to play a particular tune by selectively rotating said star wheels 72 in a counterclockwise direction to strike corresponding reeds 57.

The electro-magnetic pickup comprising the magnet 94 and the pickup member 96 pick up and feed the sounds from the vibrating reeds into the amplifier and reproducing system. The electro-magnet provides sufficient current for picking up the sound making unnecessary any other source of power for this purpose.

Applicant's pole piece 104 which initially picks up the sound of the vibrating reeds is disposed in a plane at right angles to the plane of said reeds and is of small transverse dimension and in connection with said reeds is spaced therefrom just sufficiently to avoid physical contact with the vibraiting reed. Thus, there is a very high concentration of magnetic flux at the point of the pole piece. The closeness of the pole piece to the reeds making a very narrow gap spacing gives a powerful flux density which is extremely sensitive in sound pickup giving unusually clear definition of said sound.

The small transverse dimension of the pole piece and the narrow spacing of the gap between the pole piece and the reeds for the full width of the reeds limits the sound pickup to the immediate area which results in high selectivity and concentration of said pickup.

By the use of a transistor type of amplifier system in connection with the above pickup mechanism only a one-half amp of current is required to produce a signal through the speaker 25 which can be clearly heard for a considerable distance as for a greater distance than a city block.

Record speed is controlled by speed control 35 and the sound output is controlled by volume controller 110.

Thus, the applicant has produced a very efficient and practical sound reproducing mechanism of relatively small size capable of producing a signal of sufficient volume for public addressing purposes. Applicant's device is compact and may be readily carried about seated on the hand of the operator.

It will, of course, be understood that various changes may be made in the form details, arrangement and proportions of the parts, without departing from the scope of applicant's invention, which, generally stated consists in a device capable of carrying out the objects above set forth, in the parts and combinations of parts disclosed and defined in the appended claims.

What is claimed is:

A sound reproducing device having in combination, a plurality of reeds in transversely spaced relation having their free end portions terminating in a common plane, a plurality of star wheels respectively in longitudinal alignment being positioned relative to said reeds to engage the free end portions thereof, an electromagnet, a flat elongated sound pick-up plate carried by said magnet and extending to overlie said reeds transversely and being disposed in a plane parallel to the plane of said reeds, said sound pick-up plate having its free end portion disposed downwardly in a plane at right angles to the plane of said reeds and adjacent the free end portions thereof and in close proximity thereto, a coil wound about said sound pick-up plate adjacent the free end portion thereof and closely overlying said reeds extending transversely thereof, a disk having depending studs selectively engaging said star wheels, means rotating said disk and sound reproducing means in connection with said sound pick-up plate.

References Cited in the file of this patent

UNITED STATES PATENTS

| | | |
|---|---|---|
| 1,915,858 | Miessner | June 27, 1933 |
| 2,486,545 | Alvarez | Nov. 1, 1949 |
| 2,489,149 | Makowski | Nov. 22, 1949 |
| 2,542,271 | Alvarez | Feb. 20, 1951 |
| 2,681,588 | Dyner | June 22, 1954 |
| 2,770,996 | Brodie | Nov. 20, 1956 |
| 2,881,651 | Andersen | Apr. 14, 1959 |

FOREIGN PATENTS

| | | |
|---|---|---|
| 990,405 | France | June 6, 1951 |